(12) United States Patent
Lee

(10) Patent No.: US 8,807,627 B2
(45) Date of Patent: Aug. 19, 2014

(54) SIDE PANEL ASSEMBLY FOR BUS INCLUDING FRAME AND SEAT RAIL

(71) Applicant: Hyundai Motor Company, Seoul (KR)

(72) Inventor: Sangkyu Lee, Wanju-gun (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 13/668,945

(22) Filed: Nov. 5, 2012

(65) Prior Publication Data
US 2014/0021740 A1  Jan. 23, 2014

(30) Foreign Application Priority Data
Jul. 17, 2012 (KR) .................. 10-2012-0077809

(51) Int. Cl.
*B62D 31/02* (2006.01)

(52) U.S. Cl.
USPC ................. 296/178; 296/193.05; 296/203.03; 296/63

(58) Field of Classification Search
CPC ....................................................... B62D 47/02
USPC .............. 296/178, 179, 181.4, 181.1, 193.05, 296/203.03, 29, 63, 64
See application file for complete search history.

(56) References Cited

U.S. PATENT DOCUMENTS

| | | | |
|---|---|---|---|
| 5,934,739 A * | 8/1999 | Waldeck | 296/178 |
| 6,065,261 A * | 5/2000 | Fehr et al. | 52/580 |
| 6,334,642 B1 * | 1/2002 | Waldeck et al. | 296/29 |
| 6,454,345 B1 * | 9/2002 | Campus | 296/203.01 |
| 7,690,719 B2 * | 4/2010 | Goff et al. | 296/191 |
| 7,971,926 B2 * | 7/2011 | Lemmons | 296/186.1 |
| 2007/0035147 A1 * | 2/2007 | Burzer et al. | 296/29 |
| 2008/0036240 A1 * | 2/2008 | Lusk et al. | 296/178 |

FOREIGN PATENT DOCUMENTS

| | | |
|---|---|---|
| JP | 10-203427 A | 8/1998 |
| JP | 2002-337721 A | 11/2002 |
| KR | 1991-0005939 B1 | 8/1991 |
| KR | 20-1997-0031416 (U) | 7/1997 |
| KR | 10-2002-0046289 A | 6/2002 |
| KR | 10-2002-0089723 A | 11/2002 |
| KR | 10-0461839 B1 | 12/2004 |
| KR | 10-0705399 B1 | 4/2007 |

* cited by examiner

Primary Examiner — Jason S Morrow
(74) Attorney, Agent, or Firm — Morgan, Lewis & Bockius LLP

(57) ABSTRACT

A side panel assembly for a bus including a frame and a seat rail, may include a lower panel integrally having a lower panel part which forms a lower side of a side surface of the bus, a frame part which extends from an upper side of the lower panel part, an inner side of the frame part being formed in a shape of a hollow pipe, and a seat rail part which formed in a groove shape in a longitudinal direction of the bus at an inner side of the bus in the frame part and integrally engaging a seat.

13 Claims, 8 Drawing Sheets

SIDE PANEL ASSEMBLY FOR BUS INCLUDING FRAME AND SEAT RAIL

CROSS-REFERENCE(S) TO RELATED APPLICATIONS

The present application claims priority to Korean Patent Application No. 10-2012-0077809, filed on Jul. 17, 2012, the entire contents of which is incorporated herein for all purposes by this reference.

BACKGROUND OF THE INVENTION

1. Field of the Invention

The present invention relates to a side panel for a bus, and particularly to a side panel assembly for a bus including a frame and a seat rail, the side panel assembly for a bus being featured to share the functions of a side frame installed in a lateral direction and a seat rail which is configured to engage seats.

2. Description of Related Art

A panel defining an outer configuration of a bus is mounted at the outer sides of a plurality of frames installed for the purpose of maintaining the strength of its inner construction, and a mounting bracket configured to mount a seat is engaged to the frames.

FIG. 2 is a cross sectional view taken along line I-I of FIG. 1. As shown therein, a plurality of frames, which act as a supporting structure at a side surface of a bus, are longitudinally installed, and a panel is installed at the outer side of the frames. In order for the frames to be installed in a longitudinal direction of a vehicle and to act like a frame, a waist rail 111, a skid rail 112, a skirt rail 113 and a reinforcing pipe 114 are prepared and installed, and upper and lower panels 121 and 122 are installed at the outer sides of the waist rail 111, the skid rail 112, the skirt rail 113 and the reinforcing pipe 114. Here, the upper and lower panels 121 and 122 are divided and installed at an upper panel 121 and a lower panel 122, respectively.

The conventional side panel for a bus however has a problem that since the frame maintaining a side structure of a bus and brackets 131 and 131' configured to engage the seat are separately installed, the number of parts increases, and since they should be welded to connect them together, the number of necessary work processes increases.

As shown in FIG. 3, the upper panel 121 and the lower panel 122 are welded at the skid rail 112. Since it is hard to weld in a state that the upper panel 121, the lower panel 122 and the skid rail 112 are stacked in a three-tier structure, both the lower side of the upper panel 121 and the upper side of the lower panel 122 are inevitably welded to the skid rail 112. Here the upper side of the lower panel 122 can be welded at the skid rail 112 with the aid of a fixing flap 122$a$. A mold (not shown) is additionally needed and formed for a watertight sealing at a portion where the lower side of the upper panel 121 and the upper side of the lower panel 122 are welded.

As shown in FIGS. 4 and 5, since the seat mounting brackets 131 and 131' are positioned in a previously set place, the arrangements and intervals of them cannot be changed in desired forms. The intervals of seats cannot be decreased or increased so as to increase or decrease the number of seats, and the seats are inevitably installed at only the set places where the seat mounting brackets 131 and 131' are installed. Since the number and arrangements of seats cannot be adjusted owing to the above mentioned problems, it is almost impossible to adjust the number, intervals, etc. of seats depending on customer's needs.

Some of seats might be removed from installation when it is needed to make a space for a wheelchair. Since the positions of them are fixed in the above mentioned situation, a customer himself cannot make a space for installing as many wheelchairs as the customer wants at desired installation places.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a side panel assembly for a bus in which a side panel of a bus is configured in an integrated structure for the purpose of sharing the functions of a frame maintaining a predetermined strength and a seat rail which is configured to engage seats.

In an aspect of the present invention, a side panel assembly for a bus including a frame and a seat rail, may include a lower panel integrally having a lower panel part which forms a lower side of a side surface of the bus, a frame part which extends from an upper side of the lower panel part, an inner side of the frame part being formed in a shape of a hollow pipe, and a seat rail part which formed in a groove shape in a longitudinal direction of the bus at an inner side of the bus in the frame part and integrally engaging a seat.

The side panel assembly may further include an upper panel which is positioned at an upper side of the lower panel and engaged to the frame part in order for a lower side of the upper panel to accommodate an upper side of the lower panel part.

The lower panel is manufactured in an extrusion method.
The lower panel is made from an aluminum alloy.
The upper panel is manufactured in an extrusion method.
The upper panel is made from an aluminum alloy.

The upper panel may include an upper panel part which is positioned at an upper side of the lower panel part of the lower panel and forms an upper side of the bus, and a holding part which extends from the upper panel part in a lower side of the upper panel part and holds the frame part of the lower panel, wherein the holding part is engaged to the frame part, and wherein the upper panel part and the holding part are integrally formed.

At an upper side of the frame part is formed a stopper which is step-shaped in an inward direction of the frame part and limits a lower side of the holding part from being further inserted.

A pair of holding parts is configured to hold the frame part therebetween so that an upper side of the frame part is positioned at an inner side of each holding part for thereby sealing portions between the lower panel and the upper panel.

At an upper side of the frame part is formed a stopper which is step-shaped in an inward direction of the frame part and limiting each lower side of the holding parts from being further inserted.

The seat rail part may include a holding protrusion configured to prevent a head of an engaging bolt inserted in an interior of the seat rail part from escaping.

The head of the engaging bolt is inserted into the seat rail part, and threaded portions of the engaging bolt are protruded from the seat rail part, and the threaded portions of the engaging bolt pass through a connection bracket connected to one side of the seat, and an engaging nut is engaged to the threaded portions of the engaging bolt which passes through the connection bracket for thereby fixing the connection bracket to the seat rail part.

According to the side panel assembly of a bus which shares the functions of a frame and a seat rail, the side panel forming an outer configuration of a bus is configured in an integrated structure for the purpose of sharing the functions of a frame and a seat mounting bracket, so a process for engaging each elements such as a welding process, etc. is not needed, and the number of parts can be decreased.

Since the above-mentioned side panel is manufactured in an extrusion method, no welded portions are left, and since it is made from an aluminum alloy, a primer coating process is not needed in the present invention.

Thanks to the snug fits between the upper panel of the side surface and the lower panel of the side surface, between the upper panel of the side surface and the lower panel of the side surface can be sealed without using a certain sealing member, and the sealing is made in a double sealing structure for thereby enhancing a sealing performance.

Since the seat mounting bracket is installed at the set position of the frame in the conventional art, the seats can be engaged at only the position where the seat mounting brackets are previously installed; however in the present invention, sine a seat rail part is installed in a longitudinal direction of the bus, it is possible to engage the seats at predetermined positions without changing the structure of a vehicle body. Thanks to the seats which can be freely installed at predetermined positions, the intervals and arrangements of the seats can be also freely changed depending on the number of passenger and the types of buses. A certain space where the seats are not installed can be made for the purpose of fixing a wheelchair.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
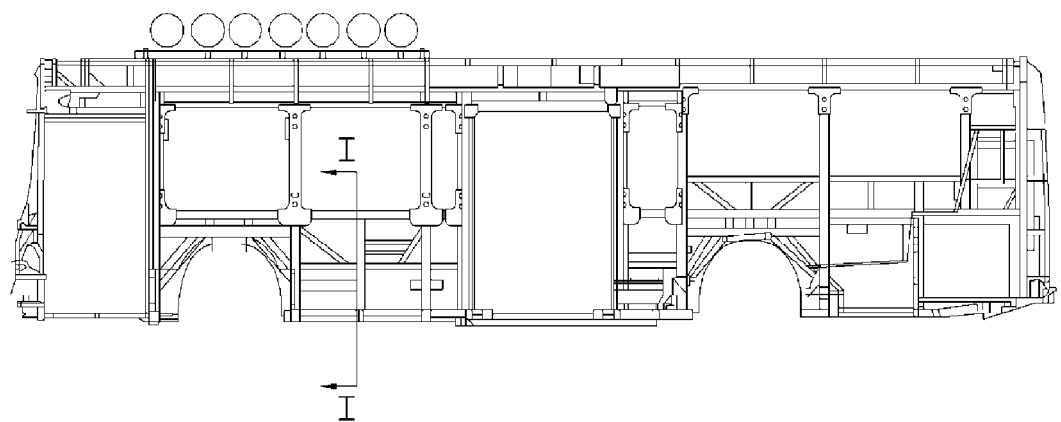
FIG. 1 is a side view illustrating a structure of a conventional bus.
Figure 2:
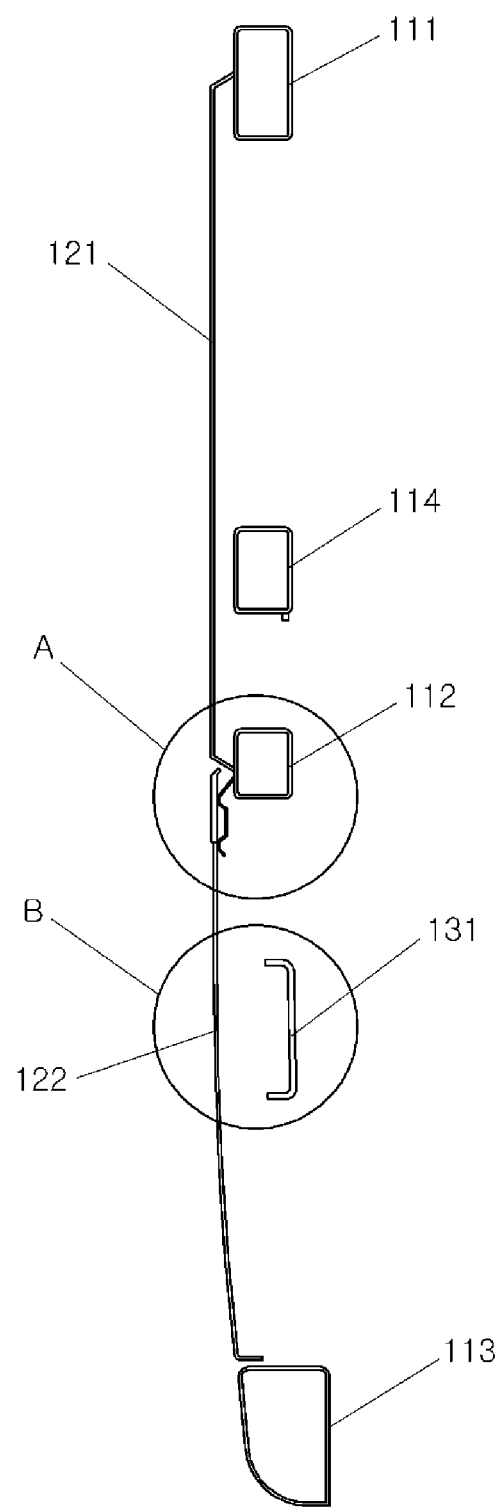
FIG. 2 is a cross sectional view taken along line I-I of FIG. 1 and illustrating a side panel, a frame and a seat mounting bracket in a conventional art.
Figure 3:
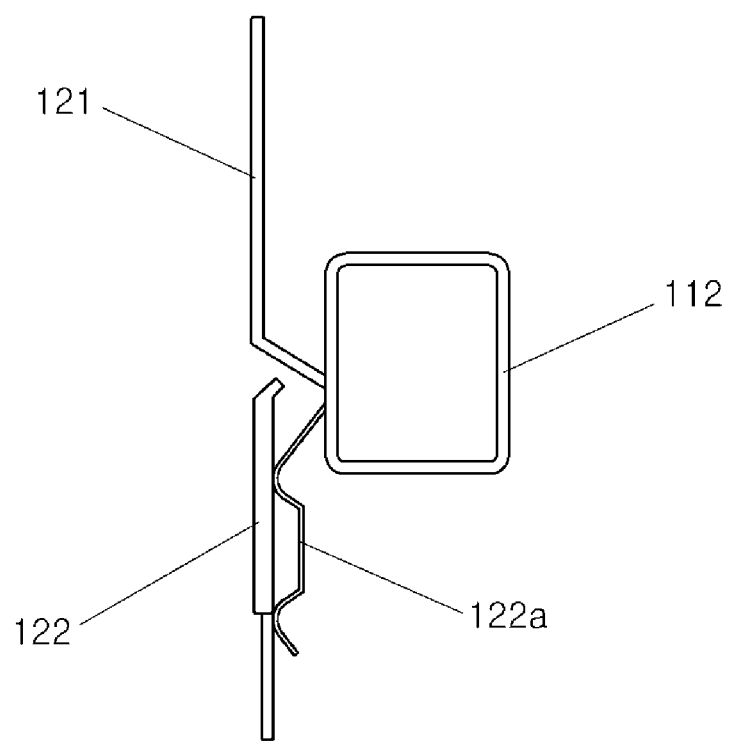
FIG. 3 is an enlarged view of a portion A of FIG. 2.
Figure 4:
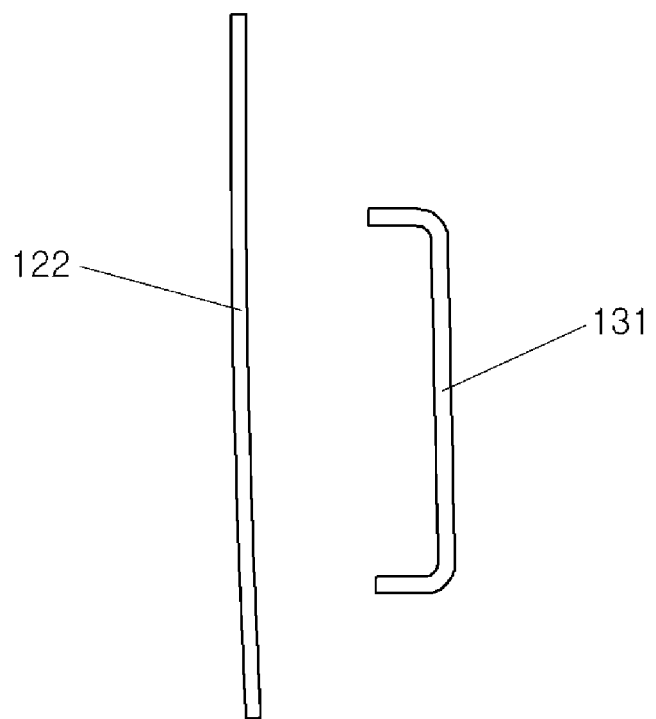
FIG. 4 is an enlarged view of a portion B of FIG. 2.
Figure 5:
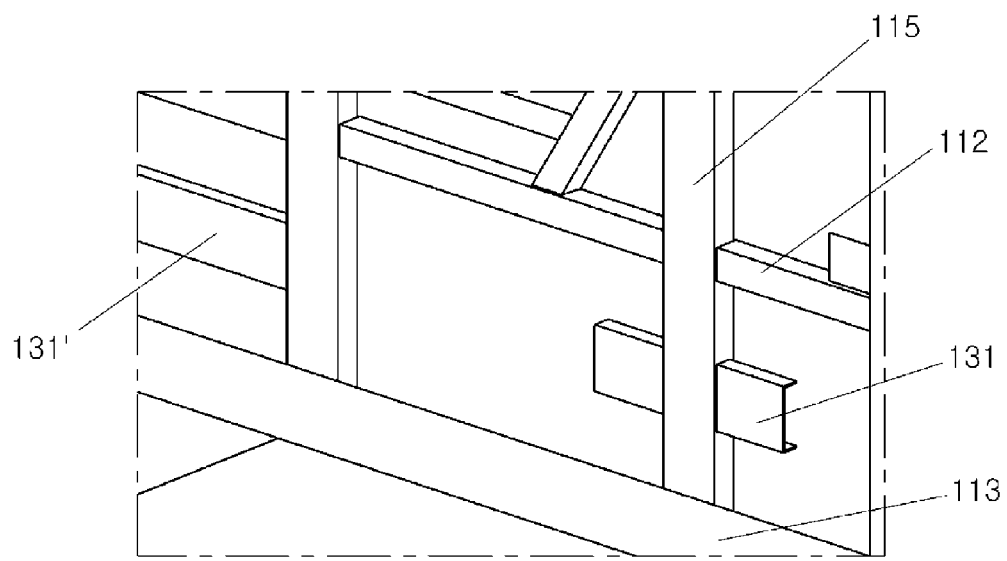
FIG. 5 is a perspective view illustrating a state that a seat mounting bracket is installed in a conventional art.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

The side panel assembly of a bus which shares the functions of a frame and a seat rail according to an exemplary embodiment of the present invention will be described.

Figure 6:
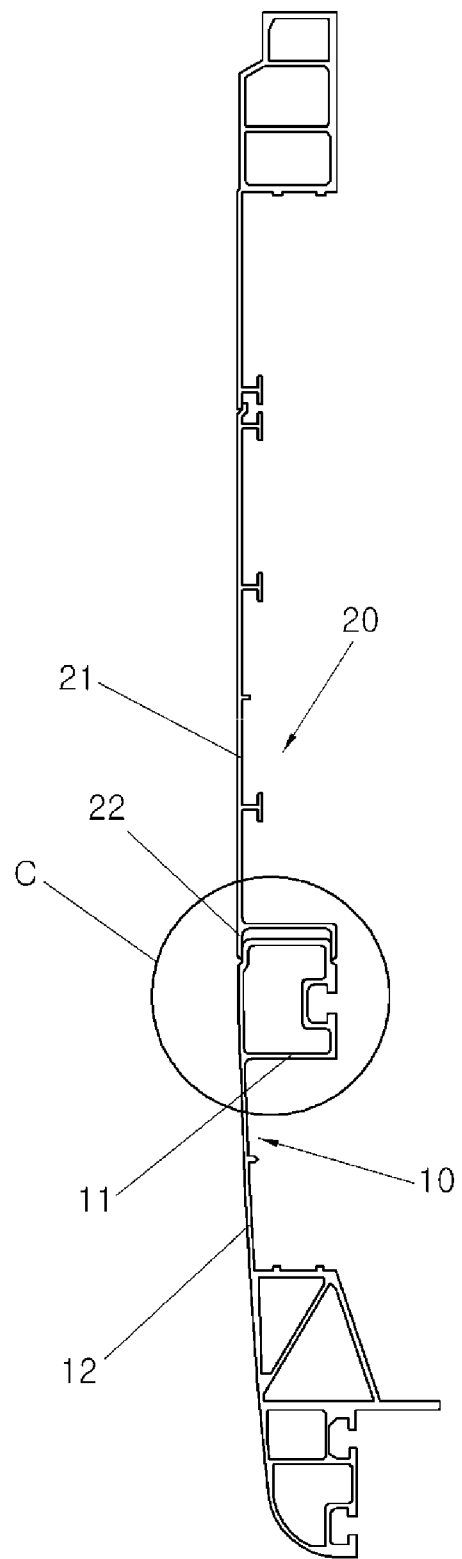
FIG. 6 is a cross sectional view illustrating a side panel assembly of a bus which shares the functions of a frame and a seat rail according to an exemplary embodiment of the present invention.
Figure 7:
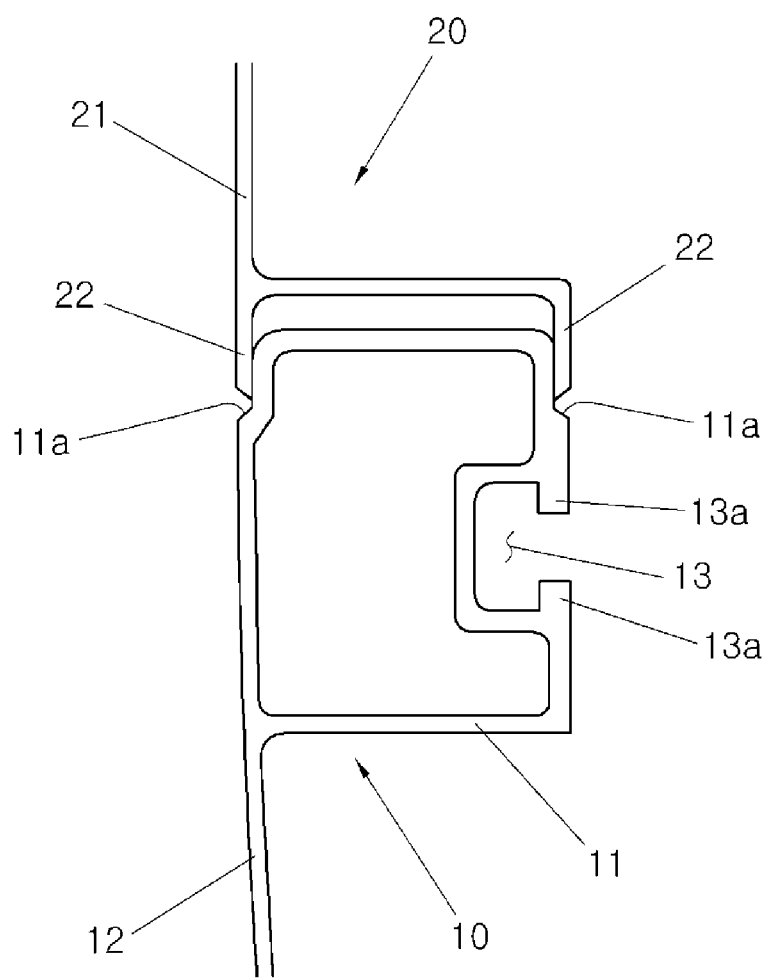
FIG. 7 is an enlarged view of a portion C of FIG. 6.

As shown in FIG. 6 and FIG. 7 which is an enlarged view of a portion C of FIG. 6, the side panel assembly of a bus which shares the functions of a frame and a seat rail according to an exemplary embodiment of the present invention can be achieved by providing integrated lower panel and upper panel and engaging them each other.

The lower panel 10 includes a lower panel part 11 forming an outer side of a bus, a frame part 12 positioned at an upper side of the lower panel part 11 and providing a predetermined strength, and a seat rail part 13 which is formed in a shape of a groove at one side of the frame part 12 and engages the seats S.

The lower panel part 11 forms an outer side of a bus. The lower panel part 11 is formed in a shape of a plate which helps form an outer side of a bus.

The frame part 12 is disposed at an upper side of the lower panel part 11 and extends from the lower panel part 11. The frame part 12 is provided to enhance strength, and the interior of it is hollow, and the entire shape of the frame part 12 is formed in a shape of a quadrangle pipe, which construction helps enhance strength.

It is preferred that the inner side and the outer side of the upper portion of the frame part 12 have step-shaped portions in the cross sections of the frame part 12 for an engagement with the upper panel 20. As the upper side of the frame part 12 is step-shaped in an inward direction, a stopper 11a is consequently formed, which limits the lower side of a holding part 22 of the upper panel 20 from being further fit.

Since both the inner side and the outer side of the upper side of the frame part 12 are step-shaped, the engaged portions become uniform in their surfaces when the lower panel 10 is engaged to the upper panel 20.

The seat rail part 13 is formed in a shape of a groove at one side of the frame part 12. The seat rail part 13 is formed in the interior of the bus in the frame part 12, in other words, is formed at a portion opposite to the portion connected to the lower panel part 11.

When viewing the cross sections of the seat rail part 13, it is formed in a shape of a groove which is inwardly concaved in an inward direction of the frame part 12, and in order to fix seats S, a holding protrusion 13a is protruded for the purpose of preventing a head of an engaging bolt 32 inserted into the seat rail part 13 from escaping.

Since the seat rail is formed in a longitudinal direction of the bus, the seats can be installed at desired positions in such a way to slide the engaging bolt 32 in the seat rail part 13 when engaging the seats S. When the head of the engaging bolt 32 is inserted in the seat rail part 13, the threaded portions of the engaging bolt 32 are protruded from the seat rail part 13.

The portion corresponding to the skirt rail of the conventional art can be integrally formed at the lower side the lower panel 10 like the frame part 12.

In the lower panel 10, the lower panel part 11, the frame part 12 and the seat rail part 13 are formed to have constant shapes of cross sections as shown in FIG. 6 and are integrated and manufactured in an extrusion method.

The lower panel 10 is made from an aluminum alloy which has a good corrosion resistance.

The upper panel 20 is positioned at an upper side of the lower panel 10, and the lower side of the upper panel 20 is engaged to the upper side of the lower panel 10. The upper panel 20 includes a holding part 22 which is engaged to the frame part 12 of the lower panel 10, and an upper panel part 21 which upwardly extends from the holding part 22 and serves to form an outer side of the bus.

The holding part 22 is engaged to the frame part 12 of the lower panel 10. The holding part 22 is formed to hold the upper side of the frame part 12 of the lower panel 10, and the holding part 22 is engaged to accommodate the frame part 12 of the lower panel 10, so the upper panel 20 and the lower panel 10 are engaged with each other.

When being engaged to the frame part 12, the holding part 22 is engaged to both the inner side and the outer side of the upper side of the holding part 22, so a dual sealing effect can be obtained between the lower panel 10 and the upper panel 20, which construction makes it possible not to use an additional sealing member like the conventional art.

A portion of the upper side of the upper panel 20, which portion corresponds to a conventional waist rail, can be integrated with the upper panel 20.

The upper panel 20 is made from an aluminum alloy and is manufactured in an extrusion method.

The lower panel 10 and the upper panel 20 are engaged at their upper and lower sides for thereby defining one side of a bus. In other words, the lower panel 10 and the upper panel 20 are engaged in such a way that the holding part 22 of the upper panel 20 is engaged to the upper side of the frame part 12 of the lower panel 10 for thereby reducing the number of necessary parts.

Since a predetermined strength can be obtained by means of the frame part 12 formed at the lower panel 10, it does not need to connect the upper panel and the lower panel by way of an additional skid rail 112 like the conventional art.

The method of installing seats S in the interior of the bus by using the side panel assembly of the bus which shares the functions of a frame and a seat rail according to an exemplary embodiment of the present invention will be described.

Figure 8:
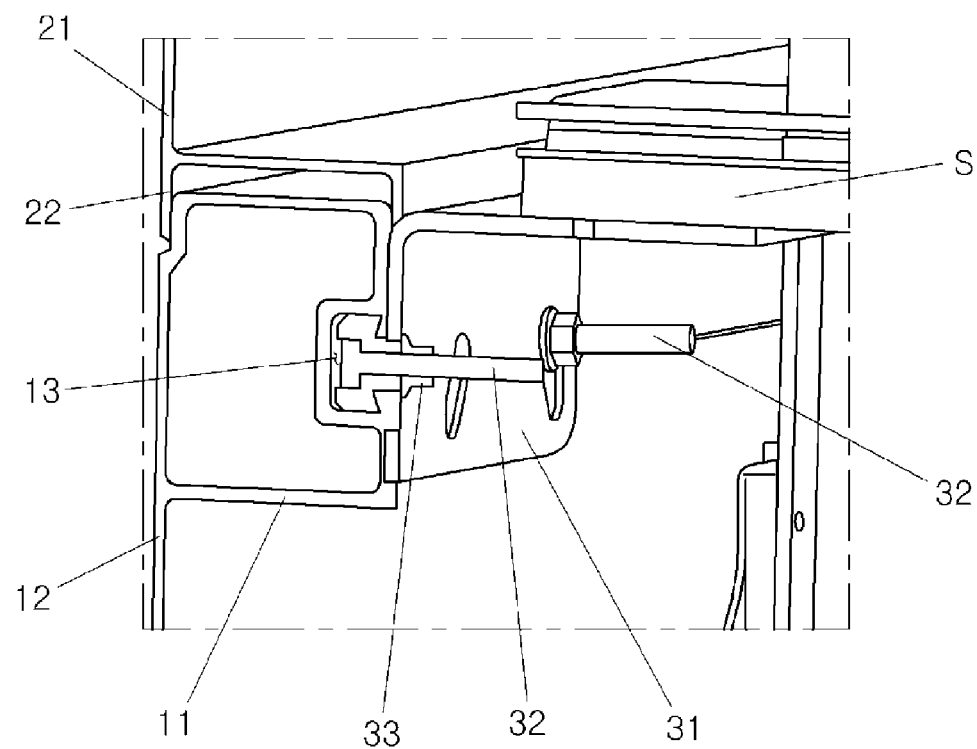
FIG. 8 is a partially cut-away perspective view illustrating a state that seats are installed using a side panel assembly of a bus which shares the functions of a frame and a seat rail according to an exemplary embodiment of the present invention.

As shown in FIG. 8, the head of the engaging bolt 32 is inserted into the seat rail part 13, and the engaging bolt 32 slides along the seat rail part 13 to the portion where to engage seats S. In a state that the engaging bolt 32 is moved to the portion where to engage the seats S, the threaded portions of the engaging bolt 32 are passed through the connection bracket 31 engaged at one side of the seat S, and an engaging nut 33 is engaged to the threaded portions of the engaging bolt 32, and the connection bracket 31 is engaged to the seat rail part 13 for thereby fixing the seat S at a certain position. The other side of the seat is fixed to a floor panel in a bolting method.

Since the seat rail part 13 is formed in a longitudinal direction of the bus in the lower panel 10, the seat is engaged at only the portion where the seat mounting brackets 131 and 131' are previously installed like the conventional art, however in an exemplary embodiment of the present invention, the positions where to engage the seats S can be determined by sliding the engaging bolt 32 in the seat rail part 13, so the seats S can be arranged and installed with the intervals, the arrangements and the number that the purchaser of a bus wants.

In addition, the installation positions and the number of wheelchair engaging spaces can be freely set, in which space common seats are not installed.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A side panel assembly for a bus including a frame and a seat rail, comprising:
   a lower panel integrally including:
      a lower panel part which forms an outer side of the bus;
      a frame part which extends from an upper side of the lower panel part, an inner side of the frame part being formed in a shape of a hollow pipe; and
      a seat rail part which formed in a groove shape in a longitudinal direction of the bus at an inner side of the bus in the frame part and for integrally engaging a seat; and
   an upper panel which is positioned at an upper side of the lower panel and engaged to the frame part in order for a lower side of the upper panel to accommodate an upper side of the lower panel part.

2. The side panel assembly of claim 1, wherein the lower panel is manufactured in an extrusion method.

3. The side panel assembly of claim 1, wherein the lower panel is made from an aluminum alloy.

4. The side panel assembly of claim 1, wherein the upper panel is manufactured in an extrusion method.

5. The side panel assembly of claim 1, wherein the upper panel is made from an aluminum alloy.

6. The side panel assembly of claim 1, wherein the upper panel includes:
   an upper panel part which is positioned at an upper side of the lower panel part of the lower panel and forms an upper side of the bus; and
   a holding part which extends from the upper panel part in a lower side of the upper panel part and holds the frame part of the lower panel, wherein the holding part is engaged to the frame part, and wherein the upper panel part and the holding part are integrally formed.

7. The side panel assembly of claim 6, wherein the lower panel and the upper panel are manufactured in an extrusion method.

8. The side panel assembly of claim 6, wherein the lower panel and the upper panel are made from an aluminum alloy.

9. The side panel assembly of claim 6, wherein at an upper side of the frame part is formed a stopper which is step-shaped in an inward direction of the frame part and limits a lower side of the holding part from being further inserted.

10. The side panel assembly of claim 6, wherein a pair of holding parts is configured to hold the frame part therebetween so that an upper side of the frame part is positioned at an inner side of each holding part for thereby sealing portions between the lower panel and the upper panel.

11. The side panel assembly of claim 10, wherein at an upper side of the frame part is formed a stopper which is step-shaped in an inward direction of the frame part and limiting each lower side of the holding parts from being further inserted.

12. The side panel assembly of claim 1, wherein the seat rail part includes a holding protrusion configured to prevent a head of an engaging bolt inserted in an interior of the seat rail part from escaping.

13. The side panel assembly of claim 12, wherein the head of the engaging bolt is inserted into the seat rail part, and threaded portions of the engaging bolt are protruded from the seat rail part, and the threaded portions of the engaging bolt pass through a connection bracket connected to one side of the seat, and an engaging nut is engaged to the threaded portions of the engaging bolt which passes through the connection bracket for thereby fixing the connection bracket to the seat rail part.

* * * * *